(12) United States Patent
Lei

(10) Patent No.: US 12,484,072 B2
(45) Date of Patent: Nov. 25, 2025

(54) METHOD AND APPARATUS FOR DOWNLINK CONTROL INFORMATION SIZE ALIGNMENT

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 315 days.

(21) Appl. No.: 18/260,470

(22) PCT Filed: Jan. 15, 2021

(86) PCT No.: PCT/CN2021/072141
§ 371 (c)(1),
(2) Date: Jul. 5, 2023

(87) PCT Pub. No.: WO2022/151348
PCT Pub. Date: Jul. 21, 2022

(65) Prior Publication Data
US 2024/0057114 A1 Feb. 15, 2024

(51) Int. Cl.
*H04W 72/232* (2023.01)
*H04W 72/121* (2023.01)
*H04W 72/1273* (2023.01)

(52) U.S. Cl.
CPC ....... *H04W 72/232* (2023.01); *H04W 72/121* (2013.01); *H04W 72/1273* (2013.01)

(58) Field of Classification Search
None
See application file for complete search history.

(56) References Cited

U.S. PATENT DOCUMENTS

2019/0297605 A1   9/2019   Kim et al.
2019/0349142 A1*  11/2019  Aiba .................... H04L 1/1819
(Continued)

FOREIGN PATENT DOCUMENTS

| CN | 111447043 A | 7/2020 |
| CN | 111903088 A | 11/2020 |
| WO | 2020204486 A1 | 10/2020 |

OTHER PUBLICATIONS 21918555.0 , "Extended European Search Report", EP Application No. 21918555.0, Sep. 4, 2024, 12 pages.
(Continued)

*Primary Examiner* — Walter J Divito
(74) *Attorney, Agent, or Firm* — FIG. 1 Patents

(57) ABSTRACT

Embodiments of the present disclosure relate to DCI size alignment. According to some embodiments of the disclosure, a method may include: receiving RRC signaling for configuring a first frequency region, wherein the first frequency region is within the frequency resource of each UE of a group of UEs including the UE; determining a size of a first DCI format according to the first frequency region; determining a size of a second DCI format according to a second frequency region; in response to the size of the first DCI format being inequal to that of the second DCI format, receiving the first DCI format within the first frequency region according to the size of the second DCI format; and receiving a first PDSCH within the first frequency region, wherein the first PDSCH is scheduled by the first DCI format.

20 Claims, 6 Drawing Sheets

(56) References Cited

U.S. PATENT DOCUMENTS

2022/0167320 A1    5/2022  Lee et al.
2023/0309105 A1*   9/2023  Yi .................... H04W 72/0446
2024/0031056 A1*   1/2024  Rastegardoost .. H04W 74/0833

OTHER PUBLICATIONS

CMCC , "Discussion on group scheduling mechanisms in NR MBS", 3GPP TSG RAN WG1 #102-e, R1-2006233, e-Meeting, Aug. 2020, 9 pages.

Lenovo , "Basic functions for broadcast/multicast in idle/inactive states", 3GPP TSG RAN WG1 #103-e, R1-2008928, E-meeting [retrieved Jun. 7, 2023]. Retrieved from the Internet <https://www.3gpp.org/ftp/TSG_RAN/WG1_RL1/TSGR1_103-e/Docs>., Oct. 2020, 3 Pages.

PCT/CN2021/072141 , "International Preliminary Report on Patentability", PCT Application No. PCT/CN2021/072141, Jul. 27, 2023, 5 pages.

PCT/CN2021/072141 , "International Search Report and Written Opinion", PCT Application No. PCT/CN2021/072141, Oct. 12, 2021, 6 pages.

ZTE , "Mechanisms to Support Group Scheduling for RRC_Connected UEs", 3GPP TSG RAN WG1 Meeting #103-e, R1-2008826, e-Meeting [retrieved Jun. 7, 2023]. Retrieved from the Internet <https://www.3gpp.org/ftp/TSG_RAN/WG1_RL1/TSGR1_103-e/Docs>., Oct. 2020, 8 Pages.

* cited by examiner

METHOD AND APPARATUS FOR DOWNLINK CONTROL INFORMATION SIZE ALIGNMENT

TECHNICAL FIELD

Embodiments of the present disclosure generally relate to wireless communication technology, and more particularly to downlink control information (DCI) size alignment.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, downlink control information (DCI) may be transmitted over a physical downlink control channel (PDCCH), and may be blindly searched for by a user equipment (UE). The search performed by the UE is problematic in that one or more decoding attempts are performed based on a hypothetical PDCCH located in a time-frequency location known as a search space. When the UE performs a decoding attempt, it assumes a certain size of the DCI. This means that when the UE tries to find two sizes of DCI, e.g., a larger DCI and a smaller DCI, the UE needs to perform two decoding attempts. Therefore, a DCI size threshold value (or DCI size budget) is required to control the blind detection. To achieve the DCI size budget, DCI size alignment may be performed.

There is a need for handling DCI size alignment in a wireless communication system.

SUMMARY

Some embodiments of the present disclosure provide a method for wireless communication performed by a user equipment (UE). The method may include: receiving radio resource control (RRC) signaling for configuring a first frequency region, wherein the first frequency region is within the frequency resource of each UE of a group of UEs including the UE; determining a size of a first downlink control information (DCI) format according to the first frequency region; determining a size of a second DCI format according to a second frequency region; in response to the size of the first DCI format being inequal to that of the second DCI format, receiving the first DCI format within the first frequency region according to the size of the second DCI format; and receiving a first physical downlink shared channel (PDSCH) within the first frequency region, wherein the first PDSCH is scheduled by the first DCI format.

Some embodiments of the present disclosure provide a method for wireless communication performed by a base station (BS). The method may include: transmitting, to a group of user equipment (UE), radio resource control (RRC) signaling for configuring a first frequency region, wherein the first frequency region is within the frequency resource of each UE of the group of UEs; determining a size of a first downlink control information (DCI) format according to the first frequency region; determining a size of a second DCI format according to a second frequency region; adjusting the size of the first DCI format until the size of the first DCI format equals the size of the second DCI format in response to the size of the first DCI format being inequal to that of the second DCI format; and transmitting, to the group of UEs, the first DCI format and a first physical downlink shared channel (PDSCH) within the first frequency region, wherein the first PDSCH is scheduled by the first DCI format.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
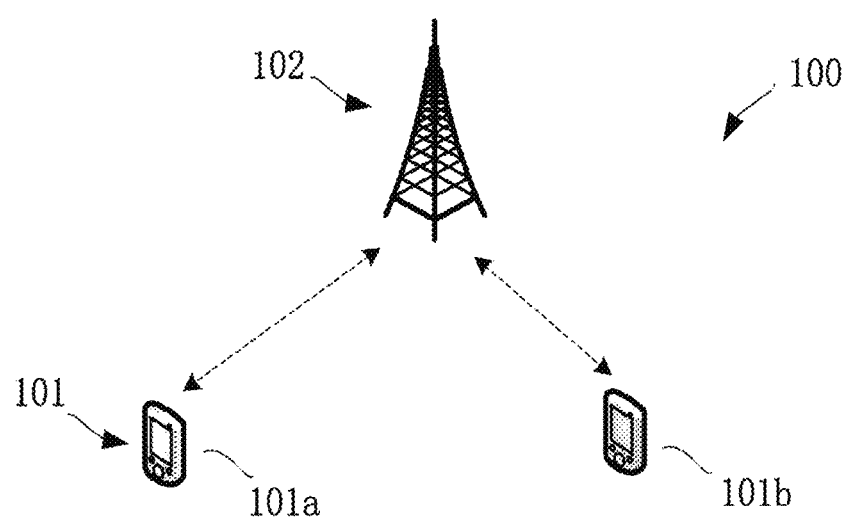
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BS s may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS s 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support multicast and broadcast services (MBSs). For example, one or more UEs (e.g., UE 101a and UE 101b) may be grouped as a MBS group to receive MBSs (e.g., a MBS PDSCH) from a BS (e.g., BS 102). Several transmission schemes including, but not limited to, the following three transmission schemes may be applied for multicast transmission: a point-to-point (PTP) transmission scheme, point-to-multipoint (PTM) transmission scheme 1, and PTM transmission scheme 2.

Under the PTP transmission scheme, RRC_CONNECTED UEs may use a UE-specific PDCCH with a cyclic redundancy check (CRC) scrambled by a UE-specific radio network temporary identifier (RNTI) (e.g., cell-RNTI (C-RNTI)) to schedule a UE-specific PDSCH which is scrambled by the same UE-specific RNTI.

Under PTM transmission scheme 1, RRC_CONNECTED UEs in the same MBS group may use a group-common PDCCH with a cyclic redundancy check (CRC) scrambled by a group-common radio network temporary identifier (RNTI) to schedule a group-common PDSCH which is scrambled by the same group-common RNTI. This scheme may also be referred to as a group-common PDCCH based group scheduling scheme.

Under PTM transmission scheme 2, RRC_CONNECTED UEs in the same MBS group may use a UE-specific PDCCH with a CRC scrambled by a UE-specific RNTI (e.g., C-RNTI) to schedule a group-common PDSCH which is scrambled by a group-common RNTI. This scheme may also be referred to as a UE-specific PDCCH based group scheduling scheme.

The "group-common PDCCH/PDSCH" may mean that the PDCCH or PDSCH is transmitted in the common time and/or frequency resources, and can be identified by all the UEs in the same MBS group. The "UE-specific PDCCH/PDSCH" may mean that the PDCCH or PDSCH can only be identified by the target UE, but cannot be identified by other UEs in the same MBS group with the target UE.

For the multicast of RRC_CONNECTED UEs, a common frequency resource for a group-common PDCCH/PDSCH may be confined within the frequency resource of a dedicated unicast bandwidth part (BWP) to support simultaneous reception of unicast and multicast in the same slot. The following options may be supported for the common frequency resource for a group-common PDCCH/PDSCH.

The first option (also referred to as "Option 2A") is that the common frequency resource may be defined as an MBS specific BWP. The MBS specific BWP may be associated with the dedicated unicast BWP and using the same numerology (e.g., sub-carrier spacing (SCS) and cyclic prefix (CP)).

The second option (also referred to as "Option 2B") is that the common frequency resource may be defined as an MBS frequency region with a number of contiguous physical resource blocks (PRBs). The MBS frequency region is configured within the dedicated unicast BWP.

According to PTM transmission scheme 1, a group-common DCI with the CRC scrambled by a group-common RNTI (e.g., group-RNTI (G-RNTI)) is used to schedule a group-common PDSCH which is scrambled by the same group-common RNTI. One problem that needs to be resolved is which DCI format is to be used as the group-common DCI. For example, fallback DCI format 1_0, non-fallback DCI format 1_1, and non-fallback DCI format 1_2 could be considered.

Another problem to be resolved is how to perform the DCI payload size alignment. According to 3GPP release 15 (R15) and release 16 (R16), a "3+1" DCI size budget should be satisfied. That is, for a cell, the total number of different DCI sizes with a C-RNTI (hereinafter, "C-RNTI DCI size") is no more than 3, and the total number of different DCI sizes (including C-RNTI DCI size(s) and other RNTI DCI size(s)) is no more than 4. "Other RNTI DCI size" refers to the size of a DCI scrambled by a RNTI other than a C-RNTI. When the group-common DCI is introduced, it should be determined whether the "3+1" DCI size budget should be maintained.

From a UE's point of view, it is reasonable to maintain the DCI payload size budget defined in R15/R16 since it will not increase the UE's blind detection effort and can reduce complexity. Hence, for a UE, it is preferred to maintain the "3+1" DCI size budget as in R15/R16 when PTM transmission scheme 1 is enabled.

Based on the "3+1" DCI size budget, another issue to be addressed is whether the group-common DCI with a CRC scrambled by the group-common RNTI is counted in the maximum three C-RNTI DCI sizes, or is counted in the maximum four DCI size budget with all RNTIs.

Firstly, the group-common DCI for PTM transmission scheme 1 is used for scheduling a group-common PDSCH. It may be inappropriate to count this group-common DCI as "other RNTI DCI size". If the size of the group-common DCI for PTM transmission scheme 1 (hereinafter, "G-RNTI DCI size") is counted as one of the other RNTI DCI sizes, G-RNTI DCI size and all the other RNTI DCI sizes (e.g., DCI format 2_x series such as DCI format 2_0, DCI format 2_1, DCI format 2_4, DCI format 2_5, and DCI format 2_6) should be aligned with the maximum DCI size among these DCI formats. Considering that the DCI format 2_x series are generally different among the UEs in the same MBS group, it would be difficult for the network to configure the same DCI size for the group-common DCI for PTM transmission scheme 1 and the DCI format 2_x series.

Secondly, if the G-RNTI DCI size is counted in the maximum "3" C-RNTI DCI size (that is, the G-RNTI DCI size for a UE should be aligned with other UEs in the same MBS group and aligned with the C-RNTI DCI size(s)), additional DCI size alignment procedure may be introduced to align C-RNTI DCI size with G-RNTI DCI size, which may cause performance degradation of C-RNTI DCI when the DCI payload size is increased.

Thirdly, for PTM transmission scheme 1, if Option 2A or Option 2B for a common frequency resource for the group-common PDCCH/PDSCH is applied, the frequency domain resource assignment (FDRA) field of a group-common PDCCH may be interpreted based on the common frequency resource. However, for DCI format 1_0 in a common search space (CSS), the FDRA field may be determined based on the bandwidth of the initial DL BWP if CORESET 0 is not configured or based on the bandwidth of CORESET 0, if CORESET 0 is configured. For DCI format 1_0 in a UE-specific search space (USS) or DCI format 1_1 in a USS, the FDRA field is determined based on the bandwidth of an active BWP. Therefore, the size of the group-common DCI for PTM transmission scheme 1 may vary depending on whether it is transmitted in a CSS or a USS with DCI format 1_0 or DCI format 1_1. Such variation in G-RNTI DCI size would need a further size alignment procedure to satisfy the "3+1" DCI size budget.

Embodiments of the present disclosure provide solutions to solve the above issues. For example, solutions for a DCI size alignment when a group-common DCI is introduced are proposed. More details on the embodiments of the present disclosure will be illustrated in the following text in combination with the appended drawings.

In some embodiments of the present disclosure, a fallback DCI format (e.g., DCI format 1_0) may be used as the group-common DCI format with a CRC scrambled by the group-common RNTI (hereinafter, taking G-RNTI as an example for simplicity). A common control resource set (CORESET) within the common frequency resource for a MBS may be defined for the group of UEs to detect the DCI format 1_0. As stated above, the common frequency resource is configured associated with a BWP dedicated for DL unicast transmission. DCI format 1_0 with a CRC scrambled by the G-RNTI for PTM scheme 1 can be transmitted in a common search space or a UE-specific search space. DCI format 1_0 with a CRC scrambled by the G-RNTI for PTM scheme 1 may be regarded as the same as a DCI format with a CRC scrambled by the UE-specific RNTI (hereinafter, taking C-RNTI as an example for simplicity) when a UE performs the DCI size alignment procedure. The total number of different DCI sizes with the C-RNTI and G-RNTI configured to be monitored is no more than "3" for a serving cell.

A UE may need to detect several DCI formats on its serving cell with CRCs scrambled by different RNTIs (e.g., G-RNTI and C-RNTI). These DCI formats may include, but not limited to, DCI format 1_0 with a CRC scrambled by a C-RNTI, DCI format 0_0 with a CRC scrambled by a C-RNTI, DCI format 1_0 with a CRC scrambled by a G-RNTI for PTM scheme 1, DCI format 0_1 with a CRC scrambled by a C-RNTI, and DCI format 1_1 with a CRC scrambled by a C-RNTI. When the total number of different C-RNTI DCI sizes and the G-RNTI DCI size configured to be monitored is more than "3" for the serving cell, an additional DCI size alignment procedure may be required combined with the current DCI size alignment procedure (which is specified in the relevant 3GPP specification), so as to align the size of DCI format 1_0 with the CRC scrambled by different RNTIs (e.g., G-RNTI and C-RNTI).

In some embodiments of the present disclosure, the additional DCI size alignment procedure can be performed according to the following steps. It is noted that DCI format 1_0 is used in below steps as an example. Other DCI formats, e.g., DCI format 1_1 or DCI format 1_2 can also be used as the group-common DCI format for multicast transmission. When DCI format 1_1 or DCI format 1_2 is used as the group-common DCI format for multicast transmission, the corresponding DCI size alignment between the DCI format 1_1 or 1_2 with a CRC scrambled by a G-RNTI and the DCI format 1_1 or 1_2 with a CRC scrambled by a C-RNTI are the same as the below steps with the assumption of DCI format 1_0.

Step 1: the size of a DCI format 1_0 with a CRC scrambled by a G-RNTI may be determined according to, for example, Table 1 as shown below, where $N_{RB}^{DL, BWP}$ is set as the number of resource blocks (RBs) within the common frequency resource configured for a MBS.

TABLE 1

Fields of DCI format 1_0

| DCI field | Size (bits) |
|---|---|
| Identifier for DCI formats | 1 |
| Frequency domain resource assignment | $\lceil \log_2(N_{RB}^{DL,BWP}(N_{RB}^{DL,BWP} + 1)/2) \rceil$ |
| Time domain resource assignment | 4 |
| VRB-to-PRB mapping | 1 |
| Modulation and coding scheme | 5 |
| New data indicator | 1 |
| Redundancy version | 2 |
| HARQ process number | 1 |
| Downlink assignment indicator | 2 |
| TPC command for scheduled PUCCH | 2 |
| PUCCH resource indicator | 3 |
| PDSCH-to-HARQ_feedback timing indicator | 3 |

It should be understood that Table 1 is only for illustrative purposes, and should not be construed as limiting the embodiments of the present disclosure. For example, a DCI format 1_0 may include fewer or more DCI fields in some other embodiments of the present disclosure. The bit size of one or more DCI fields in Table 1 may be different in some other embodiments of the present disclosure. For example, the downlink assignment indicator (DAI) field may include 2 bits for a single carrier case, and 4 bits for a multi-carrier case. In some embodiments of the present disclosure, the DAI field of the group-common DCI format for PTM transmission scheme 1 may be reinterpreted, as will be described in the following text.

Step 2: the size of a DCI format 1_0 with a CRC scrambled by a C-RNTI may be determined according to, for example, Table 1 as shown above, where $N_{RB}^{DL, BWP}$ is set as the number of RBs within the initial DL BWP if CORESET 0 is not configured on the serving cell or set as the number of RBs within CORESET 0 if CORESET 0 is configured. It should be appreciated by persons skilled in the art that the sequence of steps 1 and 2 may be changed, without departing from the spirit and scope of the disclosure.

Step 3: when the total number of different C-RNTI DCI sizes and the G-RNTI DCI size configured to be monitored is more than 3 for the serving cell, the DCI format 1_0 with the CRC scrambled by the G-RNTI and the DCI format 1_0 with the CRC scrambled by the C-RNTI may be aligned according to one or more of the following methods.

In some embodiments of the present disclosure, when the payload size of the DCI format 1_0 with a CRC scrambled by a G-RNTI prior to padding or size alignment (e.g., the size determined in above step 1) is smaller than that of the DCI format 1_0 with a CRC scrambled by a C-RNTI for scheduling the same serving cell (e.g., the size determined in above step 2), a number of padding bits (e.g., a number of bit "0") may be generated for the DCI format 1_0 with a CRC scrambled by a G-RNTI until its payload size equals that of the DCI format 1_0 with the CRC scrambled by the C-RNTI. To achieve such alignment, these padding bits may be added to the DCI format 1_0 with the CRC scrambled by the G-RNTI according to various manners.

In some examples, a number of padding bits may be generated as the most significant bits (MSBs) of the FDRA field of the DCI format 1_0 with a CRC scrambled by a G-RNTI until the size of the FDRA field of the DCI format 1_0 with the CRC scrambled by the G-RNTI equals that of the DCI format 1_0 with the CRC scrambled by the C-RNTI (or until the payload sizes of the two DCI formats are the same).

In some examples, a number of padding bits may be generated at the beginning or at the end of the DCI format 1_0 with a CRC scrambled by a G-RNTI until the payload size of the DCI format 1_0 with the CRC scrambled by the G-RNTI (i.e., after padding) equals that of the DCI format 1_0 with the CRC scrambled by the C-RNTI.

Figure 2:
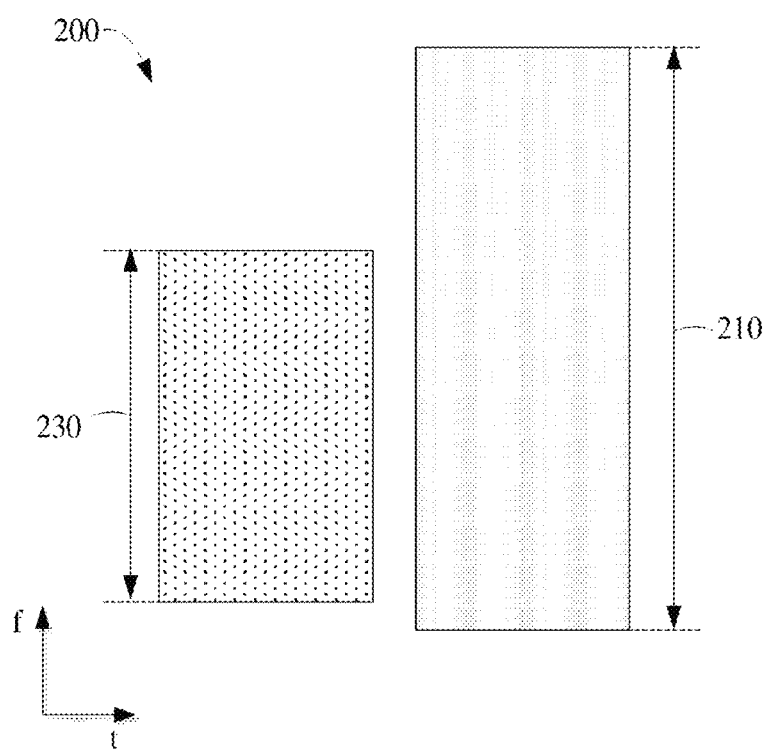
FIG. 2 illustrates exemplary radio resource allocation in accordance with some embodiments of the present disclosure.

FIG. 2 illustrates exemplary radio resource allocation 200 in accordance with some embodiments of the present disclosure. Details described in all of the foregoing embodiments of the present disclosure are applicable for the embodiments shown in FIG. 2. It should be understood that FIG. 2 is only for illustrative purposes, and should not be construed as limiting the embodiments of the present disclosure.

Referring to FIG. 2, on a serving cell, CORESET 0 is not configured while an initial DL BWP 210 is configured for a UE. The UE may be a member UE of a group of UEs. A BS may configure a common frequency resource 230 for a MBS to the group of UEs via, for example, an RRC signaling message.

In FIG. 2, the bandwidth of the common frequency resource 230 is narrower than that of the initial DL BWP 210 of the UE. In other words, the number of RBs within the common frequency resource 230 is smaller than that within the initial DL BWP 210.

Assuming that the common frequency resource 230 includes 24 RBs and the initial DL BWP 210 includes 50 RBs, the FDRA field of the DCI format 1_0 with a CRC scrambled by a G-RNTI may have 9 bits, and the FDRA field of the DCI format 1_0 with a CRC scrambled by a C-RNTI may have 11 bits. Therefore, the size of the DCI format 1_0 with the CRC scrambled by the G-RNTI (prior to padding) may be 2 bits smaller than the size of the DCI format 1_0 with the CRC scrambled by the C-RNTI.

In some examples, two padding bits (e.g., "00") may be generated as the MSBs of the FDRA field of the DCI format 1_0 with a CRC scrambled by a G-RNTI so that the FDRA fields of the two DCI formats have the same size. In some other examples, two padding bits (e.g., "00") may be generated as at the beginning or at the end of the DCI format 1_0 with the CRC scrambled by the G-RNTI so that the payload size of the two DCI formats are the same.

In some embodiments of the present disclosure, when the payload size of the DCI format 1_0 with a CRC scrambled by a G-RNTI prior to padding or size alignment (e.g., the size determined in above step 1) is larger than that of the DCI format 1_0 with a CRC scrambled by a C-RNTI for scheduling the same serving cell (e.g., the size determined in above step 2), the payload size of the DCI format 1_0 with the CRC scrambled by the G-RNTI may be adjusted to align with that of the DCI format 1_0 with the CRC scrambled by the C-RNTI according to various manners.

In some examples, a number of the most significant bits (MSBs) of the FDRA field of the DCI format 1_0 with a CRC scrambled by a G-RNTI may be truncated until the size of the FDRA field of DCI format 1_0 with the CRC scrambled by the G-RNTI equals that of the DCI format 1_0 with the CRC scrambled by the C-RNTI (or until the payload sizes of the two DCI formats are the same). The truncated MSB bits may be indicated by at least one other field of the DCI format 1_0 with the CRC scrambled by the G-RNTI.

The at least one other field may include, for example, one or more of the following: (1) a field indicating an identifier for a DCI format, (2) a transmit power control (TPC) command field, (3) a physical uplink control channel (PUCCH) resource indicator field, (4) a virtual resource block (VRB) to physical resource block (PRB) mapping field, (5) a PDSCH to hybrid automatic repeat request (HARQ) feedback timing indicator field, and (6) a downlink assignment indicator (DAI) field.

In some embodiments of the present disclosure, when either an interleaved manner or a non-interleaved manner is preconfigured or predefined for PTM transmission scheme 1, field (4) may be used to indicate the truncated MSB bits. In some embodiments of the present disclosure, when no HARQ acknowledgement (ACK) feedback is configured for PTM transmission scheme 1, field (5) may be used to indicate the truncated MSB bits.

In some embodiments of the present disclosure, the at least one other field may be selected according to a certain criterion. In some cases, each of the above fields (1)-(5) may correspond to a priority. For example, fields (1)-(5) may correspond to priorities ranging from the highest to the lowest in sequence. For instance, in case of any truncated MSB bits, field (1) among fields (1)-(5) may be selected preferentially to indicate the truncated MSB bits, followed by field (2) and so on, if needed. Other criteria may be employed.

In this way, the complete FDRA field of the DCI format 1_0 with a CRC scrambled by a G-RNTI can be jointly indicated. After the joint indication of the FDRA field of the DCI format 1_0 with a CRC scrambled by a G-RNTI, in the case that the payload size of the DCI format 1_0 with the CRC scrambled by the G-RNTI (prior to padding) is smaller than that of the DCI format 1_0 with the CRC scrambled by the C-RNTI, a number of padding bits (e.g., a number of "0") may be generated for the DCI format 1_0 with the CRC scrambled by the G-RNTI until its payload size equals that of the DCI format 1_0 with the CRC scrambled by the C-RNTI. To achieve such alignment, these padding bits may be added to the DCI format 1_0 with a CRC scrambled by a G-RNTI according to various manners including those described above (e.g., generated as the most MSBs of the FDRA field, or before a first field or after a last field of the DCI format).

Figure 3:
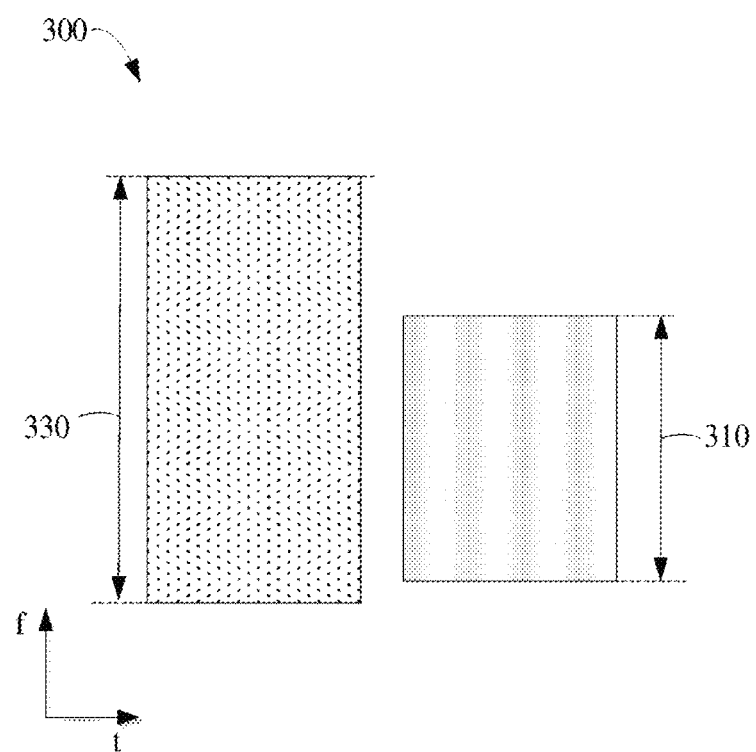
FIG. 3 illustrates exemplary radio resource allocation in accordance with some embodiments of the present disclosure.

FIG. 3 illustrates exemplary radio resource allocation 300 in accordance with some embodiments of the present disclosure. Details described in all of the foregoing embodiments of the present disclosure are applicable for the embodiments shown in FIG. 3. It should be understood that FIG. 3 is only for illustrative purposes, and should not be construed as limiting the embodiments of the present disclosure.

Referring to FIG. 3, on a serving cell, CORESET 0 is not configured, while an initial DL BWP 310 is configured for a UE. The UE may be a member UE of a group of UEs. A BS may configure a common frequency resource 330 for a MBS to the group of UEs via, for example, an RRC signaling message.

In FIG. 3, the bandwidth of the common frequency resource 330 is wider than that of the initial DL BWP 310 of the UE. In other words, the number of RBs within the common frequency resource 330 is larger than that within the initial DL BWP 310.

Assuming that the common frequency resource 330 includes 50 RBs and the initial DL BWP 310 includes 24 RBs, the FDRA field of the DCI format 1_0 with a CRC scrambled by a G-RNTI may have 11 bits, and the FDRA field of the DCI format 1_0 with a CRC scrambled by a C-RNTI may have 9 bits. Therefore, the size of the DCI format 1_0 with the CRC scrambled by the G-RNTI (prior to padding) may be 2 bits larger than the size of the DCI format 1_0 with the CRC scrambled by the C-RNTI.

In some examples, two MSBs of the FDRA field of the DCI format 1_0 with a CRC scrambled by a G-RNTI may be truncated and may be indicated by, for example, the two-bit TPC field as shown in Table 1. The adjusted payload size of the DCI format 1_0 with the CRC scrambled by the G-RNTI thus equals the payload size of the DCI format 1_0 with the CRC scrambled by the C-RNTI. In this case, no additional padding is needed.

In some examples, at least one field of the DCI format 1_0 with a CRC scrambled by a G-RNTI may be removed from this DCI format until its size is no larger than that of the DCI format 1_0 with the CRC scrambled by the C-RNTI. The at least one field may include, for example, fields (1)-(5) as mentioned above.

In some embodiments of the present disclosure, when either an interleaved manner or a non-interleaved manner is preconfigured or predefined for PTM transmission scheme 1, field (4) may be removed. In some embodiments of the present disclosure, when no HARQ-ACK feedback is configured for PTM transmission scheme 1, field (5) may be removed.

In some embodiments of the present disclosure, the at least one other field may be selected according to a certain criterion. In some cases, each of fields (1)-(5) may correspond to a priority. For example, fields (1)-(5) may correspond to priorities ranging from the highest to the lowest in sequence. For instance, field (1) among fields (1)-(5) may be removed preferentially for size alignment, followed by field (2) and so on, if needed. Other criteria may be employed.

After removing a certain field(s), in the case that the payload size of the DCI format 1_0 with a CRC scrambled by a G-RNTI (prior to padding) is smaller than that of the DCI format 1_0 with a CRC scrambled by a C-RNTI, a number of padding bits (e.g., a number of "0") may be generated for the DCI format 1_0 with the CRC scrambled by the G-RNTI until its payload size equals that of the DCI format 1_0 with the CRC scrambled by the C-RNTI. These padding bits may be added to the DCI format 1_0 with a CRC scrambled by a G-RNTI according to various manners including those described above (e.g., generated as the most MSBs of the FDRA field, or before a first field or after a last field of the DCI format).

For example, referring to FIG. 3, the number of RBs within the common frequency resource 330 is larger than that within the initial DL BWP 310. Assuming that the common frequency resource 330 includes 100 RBs and the initial DL BWP 310 includes 24 RBs, the FDRA field of the DCI format 1_0 with a CRC scrambled by a G-RNTI may have 13 bits, and the FDRA field of the DCI format 1_0 with a CRC scrambled by a C-RNTI may have 9 bits. Therefore, the size of the DCI format 1_0 with the CRC scrambled by the G-RNTI (prior to padding) may be 4 bits larger than the size of the DCI format 1_0 with the CRC scrambled by the C-RNTI.

In some examples, at least one field other than the FDRA field of the DCI format 1_0 with a CRC scrambled by a G-RNTI may be removed so that the adjusted payload size of the DCI format 1_0 with the CRC scrambled by the G-RNTI is not larger than the payload size of the DCI format 1_0 with the CRC scrambled by the C-RNTI. For example, the two-bit TPC field and the three-bit PUCCH resource indicator field as shown in Table 1 of the DCI format 1_0 with the CRC scrambled by the G-RNTI may be removed.

Accordingly, the adjusted size of the DCI format 1_0 with the CRC scrambled by the G-RNTI is 1 bit smaller than the size of the DCI format 1_0 with the CRC scrambled by the C-RNTI. One padding bit (e.g., "0") may be generated for the DCI format 1_0 with a CRC scrambled by a G-RNTI such that the payload size of the two DCI formats are the same. This padding bit may be added to the DCI format 1_0 with a CRC scrambled by a G-RNTI according to various manners as described above, for example, as the most MSB of the FDRA field, or before a first field or after a last field of the DCI format.

As stated above, for PTM transmission scheme 1, DCI format 1_0 may be used as the group-common DCI format with a CRC scrambled by the group-common RNTI (e.g., G-RNTI). The DCI format 1_0 for PTM transmission scheme 1 can thus be distinguished from the DCI format 1_0 for unicast transmission according to different RNTIs (e.g., G-RNTI and C-RNTI). Therefore, the fields in DCI format 1_0 with a CRC scrambled by a G-RNTI for PTM transmission scheme 1 can be reinterpreted or removed, without causing any ambiguity. In other words, in some respects, the fields of the DCI format 1_0 with a CRC scrambled by a G-RNTI may be different from that of a DCI format 1_0 with a CRC scrambled by a C-RNTI (e.g., as listed in Table 1 as shown above).

For example, the field indicating an identifier for a DCI format can be removed. In other words, the size of this field may be zero bits. This is because DCI format 1_0 with a CRC scrambled by a G-RNTI may always be used for downlink. In some examples, the TPC command field used for PUCCH power control which is generally a UE-specific power adjustment can be removed from the DCI format for PTM transmission scheme 1.

In some examples, a dynamic PUCCH resource indication may not be required. In other words, a PUCCH resource for HARQ-ACK feedback for a scheduled PDSCH may be preconfigured. For example, for negative ACK (NACK) only feedback, a shared PUCCH resource may be preconfigured for a group of UEs. For UE-specific ACK/NACK feedback, a UE-specific PUCCH resource may be preconfigured for each UE of the UE group. In this case, the PUCCH resource indicator field can be removed from the DCI format for PTM transmission scheme 1.

In some examples, when HARQ-ACK feedback is not configured for PTM transmission scheme 1, the PDSCH-to-HARQ feedback timing indicator field can be removed. In some examples, when either an interleaved manner or a non-interleaved manner is predetermined, preconfigured or predefined for PTM transmission scheme 1, the VRB-to-PRB mapping field can be removed.

In some examples, the HARQ process number field may be reinterpreted. For example, the number of bits for the HARQ process number field may be where N denotes the number of HARQ processes dedicated for PTM transmission scheme 1. In some examples, the DAI field can be reinterpreted, as will be described in the following text.

Based on the elimination or reinterpretation of at least one DCI field, the additional DCI size alignment procedure can be performed according to the following steps. It is noted that DCI format 1_0 is used in below steps as an example. Other DCI formats, e.g., DCI format 1_1 or DCI format 1_2 can also be used as the group-common DCI format for multicast transmission. When DCI format 1_1 or DCI format 1_2 is used as the group-common DCI format for multicast transmission, the corresponding DCI size alignment between the DCI format 1_1 or 1_2 with a CRC scrambled by a G-RNTI and the DCI format 1_1 or 1_2 with a CRC scrambled by a C-RNTI are the same as the below steps with the assumption of DCI format 1_0.

Step 1': the size of a DCI format 1_0 with a CRC scrambled by a G-RNTI may be determined according to, for example, Table 2 as shown below, where $N_{RB}^{DL,\,BWP}$ is set as the number of RBs within the common frequency resource configured for a MBS.

TABLE 2

Fields of DCI format 1_0 with CRC scrambled by G-RNTI

| DCI field | Size (bits) |
|---|---|
| Identifier for DCI formats | 0 |
| Frequency domain resource assignment | $\lceil \log_2(N_{RB}^{DL,BWP}(N_{RB}^{DL,BWP} + 1)/2 \rceil$ |
| Time domain resource assignment | 4 |
| VRB-to-PRB mapping | 0, when either an interleaved manner or a non-interleaved manner is preconfigured or predefined |
| Modulation and coding scheme | 5 |
| New data indicator | 1 |
| Redundancy version | 2 |
| HARQ process number | $\lceil \log_2 N \rceil$, where N denotes the number of HARQ processes dedicated for PTM transmission scheme 1 |
| Downlink assignment indicator | 2 for single carrier case, or 4 for multi-carrier case |
| TPC command for scheduled PUCCH | 0 |
| PUCCH resource indicator | 0 |
| PDSCH-to-HARQ_feedback timing indicator | 0, when HARQ-ACK feedback is not configured or enabled |

It should be understood that Table 2 is only for illustrative purposes, and should not be construed as limiting the embodiments of the present disclosure. For example, a DCI format 1_0 with a CRC scrambled by a G-RNTI may include fewer or more DCI fields in some other embodiments of the present disclosure. The bit size of one or more DCI fields in Table 2 may be different in some other embodiments of the present disclosure. Although a specific number (3 to 5) of zero-bit fields are listed in Table 2, it is contemplated that a DCI format 1_0 with a CRC scrambled by a G-RNTI may include fewer or more zero-bit fields in some other embodiments of the present disclosure.

Step 2': the size of a DCI format 1_0 with a CRC scrambled by a C-RNTI may be determined according to, for example, Table 1 as shown above, where $N_{RB}^{DL,\,BWP}$ is set as the number of RBs within the initial DL BWP if CORESET 0 is not configured on the serving cell or set as the number of RBs within CORESET 0 if CORESET 0 is configured. It should be appreciated by persons skilled in the art that the sequence of steps 1' and 2' may be changed, without departing from the spirit and scope of the disclosure.

Step 3': when the total number of different C-RNTI DCI sizes and the G-RNTI DCI size configured to be monitored is more than 3 for the serving cell, the DCI format 1_0 with the CRC scrambled by the G-RNTI and the DCI format 1_0 with the CRC scrambled by the C-RNTI may be aligned according to one or more of the following methods.

In some embodiments of the present disclosure, when the size of the DCI format 1_0 with the CRC scrambled by the G-RNTI prior to padding or size alignment (e.g., the size determined in above step 1') is smaller than that of the DCI format 1_0 with a CRC scrambled by a C-RNTI for scheduling the same serving cell (e.g., the size determined in above step 2'), a number of padding bits (e.g., a number of bit "0") may be generated for the DCI format 1_0 with the CRC scrambled by the G-RNTI until its payload size equals that of the DCI format 1_0 with the CRC scrambled by the C-RNTI. To achieve such alignment, these padding bits may be added to the DCI format 1_0 with the CRC scrambled by the G-RNTI according to various manners, including those described above.

For example, a number of padding bits may be generated as the MSBs of the FDRA field of the DCI format 1_0 with a CRC scrambled by a G-RNTI until the size of the FDRA field of the DCI format 1_0 with the CRC scrambled by the G-RNTI equals that of the DCI format 1_0 with the CRC scrambled by the C-RNTI (or until the sizes of the two DCI formats are the same).

In some other examples, a number of padding bits may be generated at the beginning or at the end of the DCI format 1_0 with a CRC scrambled by a G-RNTI until the size of the DCI format 1_0 with the CRC scrambled by the G-RNTI (i.e., after padding) equals that of the DCI format 1_0 with the CRC scrambled by the C-RNTI.

In some embodiments of the present disclosure, when the size of the DCI format 1_0 with a CRC scrambled by a G-RNTI prior to truncation or size alignment (e.g., the size determined in above step 1') is larger than that of the DCI format 1_0 with a CRC scrambled by a C-RNTI for scheduling the same serving cell (e.g., the size determined in above step 2'), the bitwidth of the FDRA field of the DCI format 1_0 with the CRC scrambled by the G-RNTI may be reduced by, for example, truncating a number of MSBs of the FDRA field such that the size of DCI format 1_0 with the CRC scrambled by the G-RNTI equals that of the DCI format 1_0 with the CRC scrambled by the C-RNTI.

In some embodiments of the present disclosure, the DAI of the group-common DCI format for PTM transmission scheme 1 may be counted separately from, for example, the DAI of a UE-specific DCI format.

For example, when a MBS service is transmitted only in a single serving cell (i.e., a single carrier case), the DAI field of the group-common DCI format may indicate the accumulative number of PDCCH monitoring occasions in which the DCI format for multicast (e.g., the group-common DCI format for PTM transmission scheme 1) is present on the serving cell. In some examples, the DAI field of the group-common DCI format may indicate the accumulative number of PDCCH monitoring occasions in which PDSCH reception(s) and/or semi-persistent scheduling (SPS) PDSCH release associated with the DCI format for multicast is present on the serving cell. Such DAI field may be updated from one PDCCH monitoring occasion for multicast to the next PDCCH monitoring occasion for multicast.

When a MBS service is transmitted in multiple serving cells (i.e., a multi-carrier case), the DAI field of the group-common DCI format may indicate a counter-DAI for multicast and a total DAI for multicast.

The counter-DAI for multicast may be counted within a plurality of serving cells serving a group of UEs. For example, the counter-DAI for multicast may indicate the accumulative number of PDCCH monitoring occasions in which the DCI format for multicast (e.g., the group-common DCI format for PTM transmission scheme 1) is present on the plurality of serving cells, up to the current serving cell among the plurality of serving cells for multicast and the current PDCCH monitoring occasion for multicast. In some examples, the counter-DAI for multicast may indicate the accumulative number of {serving cell, PDCCH monitoring occasion}-pair(s) in which PDSCH reception(s) and/or SPS PDSCH release associated with the DCI format for multicast is present, up to the current serving cell among the plurality of serving cells for multicast and the current PDCCH monitoring occasion for multicast. The accumulative number may be incremented first in ascending order of the serving cell indexes of the plurality of serving cells for multicast, and then in ascending order of the index of the PDCCH monitoring occasion for multicast.

The total-DAI for multicast may indicate the total number of PDCCH monitoring occasions in which the DCI format for multicast (e.g., the group-common DCI format for PTM transmission scheme 1) is present on the plurality of serving cells for multicast, up to the current PDCCH monitoring occasion for multicast. In some examples, the total-DAI for multicast may indicate the total number of {serving cell, PDCCH monitoring occasion}-pair(s) in which PDSCH reception(s) and/or SPS PDSCH release associated with the DCI format for multicast is present, up to the current PDCCH monitoring occasion for multicast. The total-DAI for multicast may be updated from one PDCCH monitoring occasion for multicast to a next PDCCH monitoring occasion for multicast.

Figure 4:
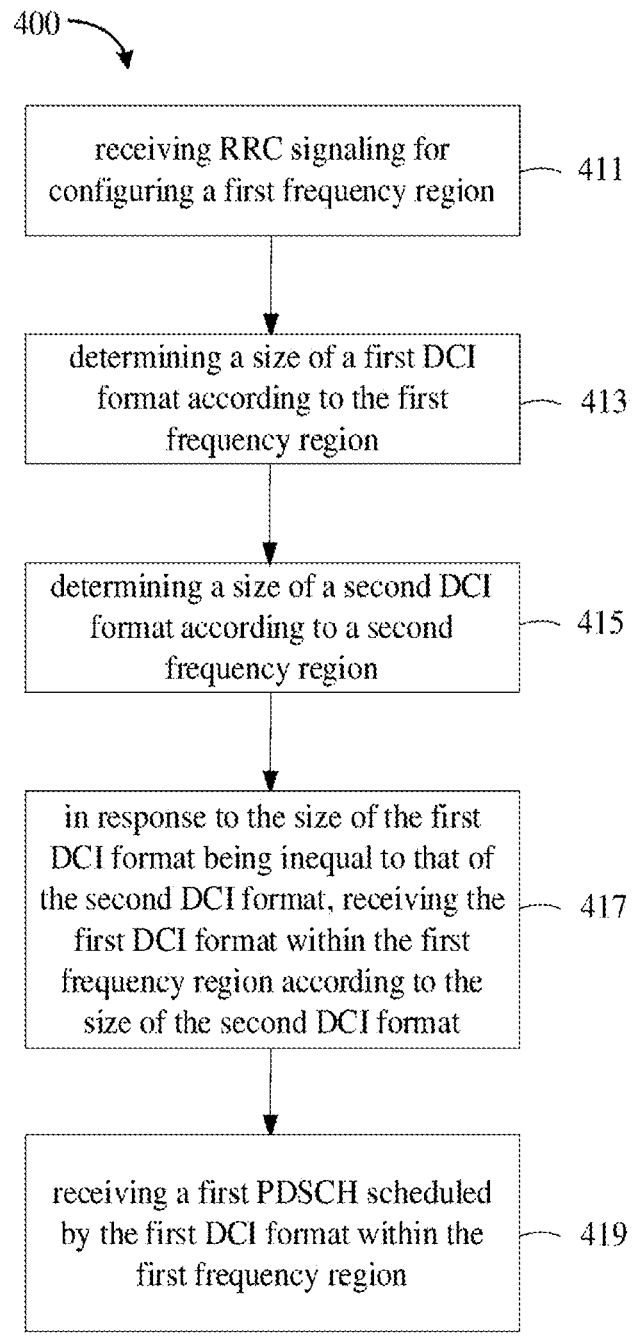
FIG. 4 illustrates a flow chart of an exemplary procedure of wireless communications in accordance with some embodiments of the present disclosure.

FIG. 4 illustrates a flow chart of an exemplary procedure 400 for wireless communications in accordance with some embodiments of the present disclosure. Details described in all of the foregoing embodiments of the present disclosure are applicable for the embodiments shown in FIG. 4. In some examples, the procedure may be performed by a UE, for example, UE 101 in FIG. 1.

Referring to FIG. 4, in operation 411, a UE may receive RRC signaling for configuring a first frequency region. The first frequency region may be within the frequency resource of each UE of a group of UEs including the UE. For example, the frequency region may be the common frequency resource for a MBS.

In operation 413, the UE may determine a size of a first DCI format according to the first frequency region. The CRC of the first DCI format may be scrambled by a first RNTI. For example, the first DCI format may be DCI format 1_0 with a CRC scrambled by a G-RNTI.

It is noted that DCI format 1_0 is used here and in below steps as an example. Other DCI formats, e.g., DCI format 1_1 or DCI format 1_2 can also be used as the group-common DCI format for multicast transmission. When DCI format 1_1 or DCI format 1_2 is used as the group-common DCI format for multicast transmission, the corresponding DCI size alignment between the DCI format 1_1 or 1_2 with a CRC scrambled by a G-RNTI and the DCI format 1_1 or 1_2 with a CRC scrambled by a C-RNTI are the same as the below steps with the assumption of DCI format 1_0.

In operation 415, the UE may determine a size of a second DCI format according to a second frequency region. The second frequency region may be a CORESET with index 0 (also known as "CORESET 0") or an initial BWP of the UE. For example, the second frequency region may be the initial DL BWP if CORESET 0 is not configured or CORESET 0 if CORESET 0 is configured. The CRC of the second DCI format may be scrambled by a second RNTI. For example, the second DCI format may be DCI format 1_0 with a CRC scrambled by a C-RNTI.

In operation 417, in response to the size of the first DCI format being inequal to that of the second DCI format, the UE may receive the first DCI format within the first frequency region according to the size of the second DCI format. In other words, the BS may perform a DCI size alignment to align the size of the first DCI format with that of the second DCI format before transmitting the first DCI format. In some embodiments of the present disclosure, the first DCI format may be received within a CORESET configured for the group of UEs within the first frequency region.

In some embodiments of the present disclosure, in response to the size of the first DCI format being larger than the size of the second DCI format, a number of the MSBs of the FDRA field of the first DCI format may be truncated such that the FDRA field of the first DCI format equals that of the second DCI format. The truncated MSBs of the FDRA field of the first DCI format may be indicated by at least one other field of the first DCI format. In some other embodiments of the present disclosure, at least one other field of the first DCI format may be removed from the first DCI format such that the size of the first DCI format is no larger than that of the second DCI format.

In some embodiments of the present disclosure, the at least one other field of the first DCI format may include one or more of the following: a field indicating an identifier for a DCI format, a TPC command field, a PUCCH resource indicator field, a VRB-to-PRB mapping field, a PDSCH-to-HARQ feedback timing indicator field, and a DAI field.

In some embodiments of the present disclosure, a size of one or more of the following fields in the first DCI format may be zero bits: a field indicating an identifier for a DCI format; a TPC command field; a PUCCH resource indicator field in response to a PUCCH resource for HARQ-ACK feedback for the PDSCH (hereinafter, "first PDSCH") scheduled by the first DCI format is preconfigured; a PDSCH to HARQ feedback timing indicator field in response to HARQ-ACK feedback for the first PDSCH not being enabled; and a VRB-to-PRB mapping field in response to either an interleaved manner or non-interleaved manner being predetermined for the first PDSCH.

In some embodiments of the present disclosure, in response to the size of the first DCI format being larger than the size of the second DCI format, a number of the MSBs of the FDRA field of the first DCI format may be truncated such that the size of the first DCI format equals that of the second DCI format.

In some embodiments of the present disclosure, in response to the size of the first DCI format being smaller than the size of the second DCI format, a number of padding bits may be generated as the MSBs of the FDRA field of the first DCI format such that the size of the FDRA field of the first DCI format equals that of the second DCI format. In some other embodiments of the present disclosure, in response to the size of the first DCI format being smaller than the size of the second DCI format, a number of padding bits may be generated at the beginning or end of the first DCI format such that the size of the first DCI format equals that of the second DCI format. Therefore, the first DCI format received by the UE may include a number of padding bits.

In some embodiments of the present disclosure, the first DCI format may include a DAI indicating an accumulative number of PDCCH monitoring occasions in which the first DCI format is present on a serving cell of the UE. The DAI may be updated from one PDCCH monitoring occasion associated with the first DCI format to a next PDCCH monitoring occasion associated with the first DCI format.

In some embodiments of the present disclosure, the first DCI format may include a first DAI and a second DAI. The first DAI and second DAI may be a counter DAI and total DAI as described above, respectively.

For example, the first DAI may indicate an accumulative number of PDCCH monitoring occasions in which the first DCI format is present on a plurality of serving cells serving the group of UEs, up to a current serving cell of the UE among the plurality of serving cells and current PDCCH monitoring occasion associated with the first DCI format. The accumulative number may be incremented first in ascending order of the serving cell indexes of the plurality of serving cells and then in ascending order of PDCCH monitoring occasions associated with the first DCI format. The second DAI may indicate a total number of PDCCH monitoring occasions in which the first DCI format is present on the plurality of serving cells, up to the current PDCCH monitoring occasion associated with the first DCI format. The second DAI may be updated from one PDCCH monitoring occasion associated with the first DCI format to a next PDCCH monitoring occasion associated with the first DCI format.

In operation 419, the UE may receive the first PDSCH scheduled by the first DCI format within the first frequency region.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
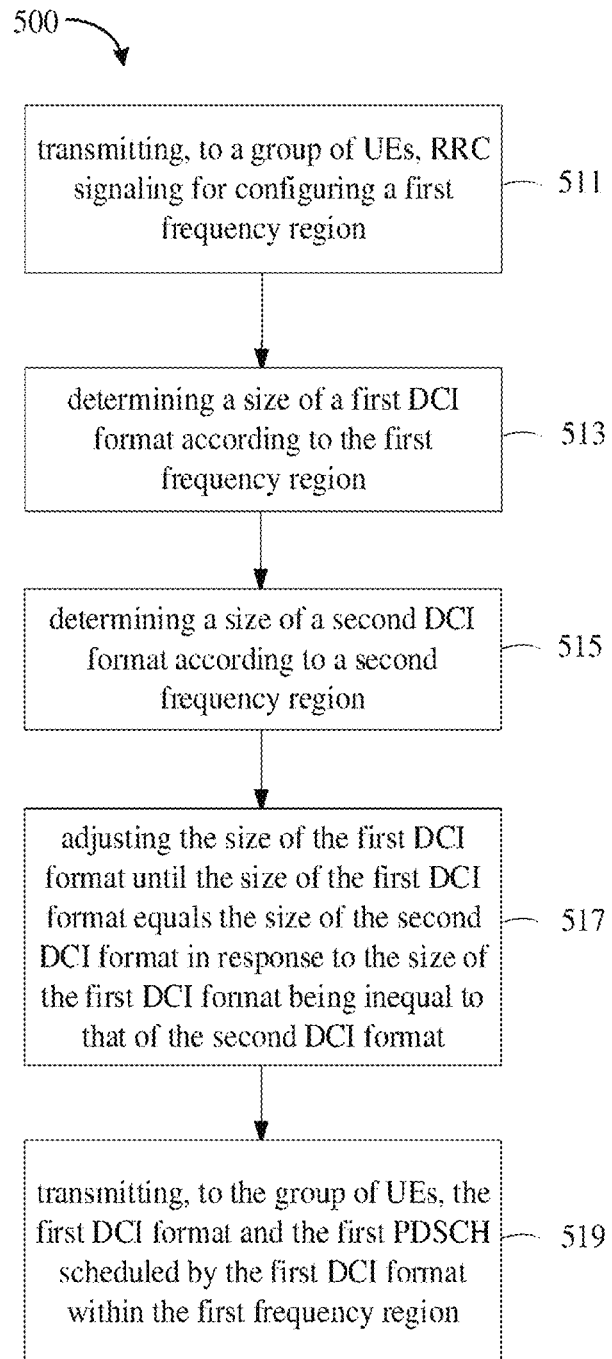
FIG. 5 illustrates a flow chart of an exemplary procedure of wireless communications in accordance with some embodiments of the present disclosure.

FIG. 5 illustrates a flow chart of an exemplary procedure 500 for wireless communications in accordance with some embodiments of the present disclosure. Details described in all of the foregoing embodiments of the present disclosure are applicable for the embodiments shown in FIG. 5. In some examples, the procedure may be performed by a BS, for example, BS 102 in FIG. 1.

Referring to FIG. 5, in operation 511, a BS may transmit, to a group of UEs, RRC signaling for configuring a first frequency region. The first frequency region may be within the frequency resource of each UE of the group of UEs. For example, the frequency region may be the common frequency resource for a MBS.

In operation 513, the BS may determine a size of a first DCI format according to the first frequency region. The CRC of the first DCI format may be scrambled by a first RNTI. For example, the first DCI format may be DCI format 1_0 with a CRC scrambled by a G-RNTI.

It is noted that DCI format 1_0 is used here and in below steps as an example. Other DCI formats, e.g., DCI format 1_1 or DCI format 1_2 can also be used as the group-common DCI format for multicast transmission. When DCI format 1_1 or DCI format 1_2 is used as the group-common DCI format for multicast transmission, the corresponding DCI size alignment between the DCI format 1_1 or 1_2 with a CRC scrambled by a G-RNTI and the DCI format 1_1 or 1_2 with a CRC scrambled by a C-RNTI are the same as the below steps with the assumption of DCI format 1_0.

In operation 515, the BS may determine a size of a second DCI format according to a second frequency region. The second frequency region may be a CORESET with index 0 (also known as "CORESET 0") or an initial BWP of the group of UEs. For example, the second frequency region may be CORESET 0 if CORESET 0 is configured or the initial DL BWP if CORESET 0 is not configured. The CRC of the second DCI format may be scrambled by a second RNTI. For example, the second DCI format may be DCI format 1_0 with a CRC scrambled by a C-RNTI.

In operation 517, in response to the size of the first DCI format being inequal to that of the second DCI format, the BS may adjust the size of the first DCI format until the size of the first DCI format equals the size of the second DCI format. For example, the BS may perform a DCI size alignment as described above to align the size of the first DCI format with that of the second DCI format before transmitting the first DCI format. In some embodiments of the present disclosure, the first DCI format may be transmitted within a CORESET configured for the group of UEs within the first frequency region.

In some embodiments of the present disclosure, to adjust the size of the first DCI format, the BS may, in response to the size of the first DCI format being larger than the size of the second DCI format, truncate a number of the MSBs of the FDRA field of the first DCI format until the FDRA field of the first DCI format equals that of the second DCI format, and indicate the truncated MSBs of the FDRA field of the first DCI format by at least one other field of the first DCI format. In some other embodiments of the present disclosure, to adjust the size of the first DCI format, the BS may, in response to the size of the first DCI format being larger than the size of the second DCI format, remove at least one other field of the first DCI format from the first DCI format until the size of the first DCI format is no larger than that of the second DCI format.

In some embodiments of the present disclosure, the at least one other field of the first DCI format may include one or more of the following: a field indicating an identifier for a DCI format, a TPC command field, a PUCCH resource indicator field, a VRB-to-PRB mapping field, a PDSCH-to-HARQ feedback timing indicator field, and a DAI field.

In some embodiments of the present disclosure, a size of one or more of the following fields in the first DCI format may be zero bits: a field indicating an identifier for a DCI format; a TPC command field; a PUCCH resource indicator field in response to a PUCCH resource for HARQ-ACK feedback for the PDSCH (hereinafter, "first PDSCH") scheduled by the first DCI format is preconfigured; a PDSCH to HARQ feedback timing indicator field in response to HARQ-ACK feedback for the first PDSCH not being enabled; and a VRB-to-PRB mapping field in response to either an interleaved manner or non-interleaved manner being predetermined for the first PDSCH.

In some embodiments of the present disclosure, to adjust the size of the first DCI format, the BS may, in response to the size of the first DCI format being larger than the size of the second DCI format, truncate a number of the MSBs of the FDRA field of the first DCI format until the size of the first DCI format equals that of the second DCI format.

In some embodiments of the present disclosure, to adjust the size of the first DCI format, the BS may, in response to the size of the first DCI format being smaller than the size of the second DCI format, generate a number of padding bits as the MSBs of the FDRA field of the first DCI format until the size of the FDRA field of the first DCI format equals that of the second DCI format. In some other embodiments of the present disclosure, to adjust the size of the first DCI format, the BS may, in response to the size of the first DCI format being smaller than the size of the second DCI format, generate a number of padding bits before a first field or after a last field of the first DCI format until the size of the first DCI format equals that of the second DCI format.

In some embodiments of the present disclosure, the first DCI format may include a DAI indicating an accumulative number of PDCCH monitoring occasions in which the first DCI format is present on a serving cell serving the group of UEs. The DAI may be updated from one PDCCH monitoring occasion associated with the first DCI format to a next PDCCH monitoring occasion associated with the first DCI format.

In some embodiments of the present disclosure, the first DCI format may include a first DAI and a second DAI. The first DAI and second DAI may be a counter DAI and total DAI as described above, respectively.

For example, the first DAI may indicate an accumulative number of PDCCH monitoring occasions in which the first DCI format is present on a plurality of serving cells serving the group of UEs, up to a current serving cell among the plurality of serving cells and current PDCCH monitoring occasion associated with the first DCI format. The accumulative number may be incremented first in ascending order of the serving cell indexes of the plurality of serving cells and then in ascending order of PDCCH monitoring occasions associated with the first DCI format. The second DAI may indicate a total number of PDCCH monitoring occasions in which the first DCI format is present on the plurality of serving cells, up to the current PDCCH monitoring occasion associated with the first DCI format. The second DAI may be updated from one PDCCH monitoring occasion associated with the first DCI format to a next PDCCH monitoring occasion associated with the first DCI format.

In operation 519, the BS may transmit, to the group of UEs, the first DCI format and the first PDSCH scheduled by the first DCI format within the first frequency region.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
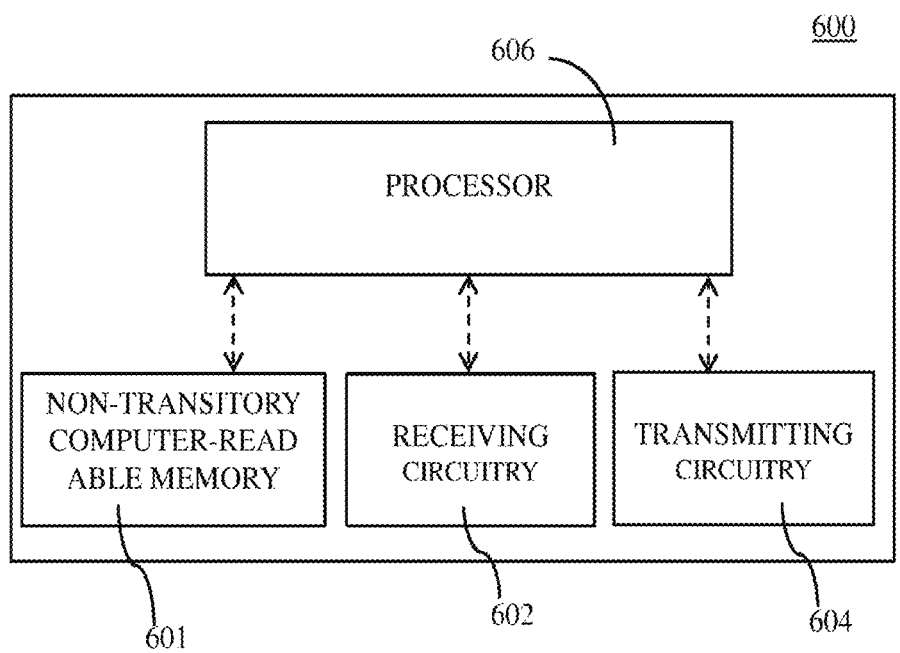
FIG. 6 illustrates a block diagram of an exemplary apparatus in accordance with some embodiments of the present disclosure.

FIG. 6 illustrates a block diagram of an exemplary apparatus 600 according to some embodiments of the present disclosure.

As shown in FIG. 6, the apparatus 600 may include at least one non-transitory computer-readable medium 601, at least one receiving circuitry 602, at least one transmitting circuitry 604, and at least one processor 606 coupled to the non-transitory computer-readable medium 601, the receiving circuitry 602 and the transmitting circuitry 604. The apparatus 600 may be a base station side apparatus (e.g., a BS) or a communication device (e.g., a UE).

Although in this figure, elements such as the at least one processor 606, transmitting circuitry 604, and receiving circuitry 602 are described in the singular, the plural is contemplated unless a limitation to the singular is explicitly stated. In some embodiments of the present application, the receiving circuitry 602 and the transmitting circuitry 604 are combined into a single device, such as a transceiver. In certain embodiments of the present application, the apparatus 600 may further include an input device, a memory, and/or other components.

In some embodiments of the present disclosure, the non-transitory computer-readable medium 601 may have stored thereon computer-executable instructions to cause a processor to implement the method with respect to the UEs as described above. For example, the computer-executable instructions, when executed, cause the processor 606 interacting with receiving circuitry 602 and transmitting circuitry 604, so as to perform the operations with respect to the UEs described in FIGS. 1-4.

In some embodiments of the present disclosure, the non-transitory computer-readable medium 601 may have stored thereon computer-executable instructions to cause a processor to implement the method with respect to the BS s as described above. For example, the computer-executable instructions, when executed, cause the processor 606 interacting with receiving circuitry 602 and transmitting circuitry 604, so as to perform the operations with respect to the BS s described in FIGS. 1-3 and 5.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed is:

1. A method for wireless communications performed by a user equipment (UE), comprising:
   receiving a radio resource control (RRC) signaling for configuring a first frequency region, wherein the first frequency region is within a frequency resource of each UE of a group of UEs including the UE;
   determining a size of a first downlink control information (DCI) format according to the first frequency region;
   determining a size of a second DCI format according to a second frequency region;
   in response to the size of the first DCI format being inequal to that of the second DCI format, receiving the first DCI format within the first frequency region according to the size of the second DCI format; and
   receiving a first physical downlink shared channel (PDSCH) within the first frequency region, wherein the first PDSCH is scheduled by the first DCI format.

2. The method of claim 1, wherein a cyclic redundancy check (CRC) of the first DCI format is scrambled by a first radio network temporary identifier (RNTI) and a CRC of the second DCI format is scrambled by a second RNTI.

3. The method of claim 2, wherein a size of one or more fields in the first DCI format is zero bits, the fields including:
   a field indicating an identifier for a DCI format;
   a transmission power control (TPC) command field;
   a physical uplink control channel (PUCCH) resource indicator field in response to a PUCCH resource for hybrid automatic repeat request acknowledgement (HARQ-ACK) feedback for the first PDSCH is preconfigured;
   a PDSCH to HARQ feedback timing indicator field in response to HARQ-ACK feedback for the first PDSCH not being enabled; and
   a virtual resource block (VRB) to physical resource block (PRB) mapping field in response to either an interleaved manner or non-interleaved manner being predetermined for the first PDSCH.

4. The method of claim 3, wherein in response to the size of the first DCI format being smaller than the size of the second DCI format:
   a number of padding bits is generated as most significant bits (MSBs) of a frequency domain resource assignment (FDRA) field of the first DCI format such that the size of the FDRA field of the first DCI format equals that of the second DCI format; or
   a number of padding bits is generated at a beginning or end of the first DCI format such that the size of the first DCI format equals that of the second DCI format.

5. The method of claim 1, wherein in response to the size of the first DCI format being smaller than the size of the second DCI format:
   a number of padding bits is generated as most significant bits (MSBs) of a frequency domain resource assignment (FDRA) field of the first DCI format such that the size of the FDRA field of the first DCI format equals that of the second DCI format; or
   a number of padding bits is generated at a beginning or end of the first DCI format such that the size of the first DCI format equals that of the second DCI format.

6. An apparatus, comprising:
   a receiving circuitry;
   a transmitting circuitry; and
   a processor coupled to the receiving circuitry and the transmitting circuitry configured to cause the apparatus to:
   transmit, to a group of user equipments (UEs), a radio resource control (RRC) signaling for configuring a first frequency region, wherein the first frequency region is within a frequency resource of each UE of the group of UEs;
   determine a size of a first downlink control information (DCI) format according to the first frequency region;
   determine a size of a second DCI format according to a second frequency region;
   adjust the size of the first DCI format until the size of the first DCI format equals the size of the second DCI format in response to the size of the first DCI format being inequal to that of the second DCI format; and
transmit, to the group of UEs, the first DCI format and a first physical downlink shared channel (PDSCH) within the first frequency region, wherein the first PDSCH is scheduled by the first DCI format.

7. The apparatus of claim 6, wherein to adjust the size of the first DCI format is to: in response to the size of the first DCI format being larger than the size of the second DCI format,
truncate a number of most significant bits (MSBs) of a frequency domain resource assignment (FDRA) field of the first DCI format until the FDRA field of the first DCI format equals that of the second DCI format, and indicate the truncated MSBs of the FDRA field of the first DCI format by at least one other field of the first DCI format; or
remove at least one other field of the first DCI format from the first DCI format until the size of the first DCI format is no larger than that of the second DCI format.

8. A user equipment (UE), comprising:
a receiving circuitry;
a transmitting circuitry; and
a processor coupled to the receiving circuitry and the transmitting circuitry configured to cause the UE to:
receive a radio resource control (RRC) signaling for configuring a first frequency region, wherein the first frequency region is within a frequency resource of each UE of a group of UEs including the UE;
determine a size of a first downlink control information (DCI) format according to the first frequency region;
determine a size of a second DCI format according to a second frequency region;
in response to the size of the first DCI format being inequal to that of the second DCI format, receive the first DCI format within the first frequency region according to the size of the second DCI format; and
receive a first physical downlink shared channel (PDSCH) within the first frequency region, wherein the first PDSCH is scheduled by the first DCI format.

9. The UE of claim 8, wherein in response to the size of the first DCI format being larger than the size of the second DCI format:
a number of most significant bits (MSBs) of a frequency domain resource assignment (FDRA) field of the first DCI format is truncated such that the FDRA field of the first DCI format equals that of the second DCI format, and the truncated MSBs of the FDRA field of the first DCI format is indicated by at least one other field of the first DCI format; or
at least one other field of the first DCI format is removed from the first DCI format such that the size of the first DCI format is no larger than that of the second DCI format.

10. The UE of claim 9, wherein the at least one other field of the first DCI format includes one or more of following:
a field indicating an identifier for a DCI format,
a transmission power control (TPC) command field,
a physical uplink control channel (PUCCH) resource indicator field,
a virtual resource block (VRB) to physical resource block (PRB) mapping field,
a PDSCH to hybrid automatic repeat request (HARQ) feedback timing indicator field, and
a downlink assignment indicator (DAI) field.

11. The UE of claim 8, wherein a cyclic redundancy check (CRC) of the first DCI format is scrambled by a first radio network temporary identifier (RNTI) and a CRC of the second DCI format is scrambled by a second RNTI.

12. The UE of claim 11, wherein a size of one or more fields in the first DCI format is zero bits, the fields including:
a field indicating an identifier for a DCI format;
a transmission power control (TPC) command field;
a physical uplink control channel (PUCCH) resource indicator field in response to a PUCCH resource for hybrid automatic repeat request acknowledgement (HARQ-ACK) feedback for the first PDSCH is pre-configured;
a PDSCH to HARQ feedback timing indicator field in response to HARQ-ACK feedback for the first PDSCH not being enabled; and
a virtual resource block (VRB) to physical resource block (PRB) mapping field in response to either an interleaved manner or non-interleaved manner being predetermined for the first PDSCH.

13. The UE of claim 12, wherein in response to the size of the first DCI format being larger than the size of the second DCI format,
a number of most significant bits (MSBs) of a frequency domain resource assignment (FDRA) field of the first DCI format is truncated such that the size of the first DCI format equals that of the second DCI format.

14. The UE of claim 12, wherein in response to the size of the first DCI format being smaller than the size of the second DCI format:
a number of padding bits is generated as most significant bits (MSBs) of a frequency domain resource assignment (FDRA) field of the first DCI format such that the size of the FDRA field of the first DCI format equals that of the second DCI format; or
a number of padding bits is generated at a beginning or end of the first DCI format such that the size of the first DCI format equals that of the second DCI format.

15. The UE of claim 8, wherein in response to the size of the first DCI format being smaller than the size of the second DCI format:
a number of padding bits is generated as most significant bits (MSBs) of a frequency domain resource assignment (FDRA) field of the first DCI format such that the size of the FDRA field of the first DCI format equals that of the second DCI format; or
a number of padding bits is generated at a beginning or end of the first DCI format such that the size of the first DCI format equals that of the second DCI format.

16. The UE of claim 8, wherein the first DCI format includes a downlink assignment indicator (DAI) indicating an accumulative number of physical downlink control channel (PDCCH) monitoring occasions in which the first DCI format is present on a serving cell of the UE.

17. The UE of claim 8, wherein:
the first DCI format includes a first downlink assignment indicator (DAI) and a second DAI;
the first DAI indicates an accumulative number of physical downlink control channel (PDCCH) monitoring occasions in which the first DCI format is present on a plurality of serving cells serving the group of UEs, up to a current serving cell of the UE among the plurality of serving cells and current PDCCH monitoring occasion associated with the first DCI format, and the accumulative number is incremented first in ascending order of serving cell index of the plurality of serving cells and then in ascending order of PDCCH monitoring occasions associated with the first DCI format; and the second DAI indicates a total number of PDCCH monitoring occasions in which the first DCI format is present on the plurality of serving cells, up to the current PDCCH monitoring occasion associated with the first DCI format.

18. The UE of claim 17, wherein the first DAI or the second DAI is updated from one PDCCH monitoring occasion associated with the first DCI format to a next PDCCH monitoring occasion associated with the first DCI format.

19. The UE of claim 8, wherein the first DCI format is received within a control resource set (CORESET) configured for the group of UEs within the first frequency region.

20. The UE of claim 8, wherein the second frequency region is a control resource set (CORESET) with index 0 or an initial downlink bandwidth part (BWP).

* * * * *